Aug. 30, 1938. C. G. WALL Re. 20,836

APPARATUS FOR MIXING FLUIDS

Original Filed July 18, 1936 2 Sheets-Sheet 1

INVENTOR

Charles G. Wall,

BY

Bates, Golrick & Teare,

ATTORNEYS

APPARATUS FOR MIXING FLUIDS
Original Filed July 18, 1936 2 Sheets-Sheet 2
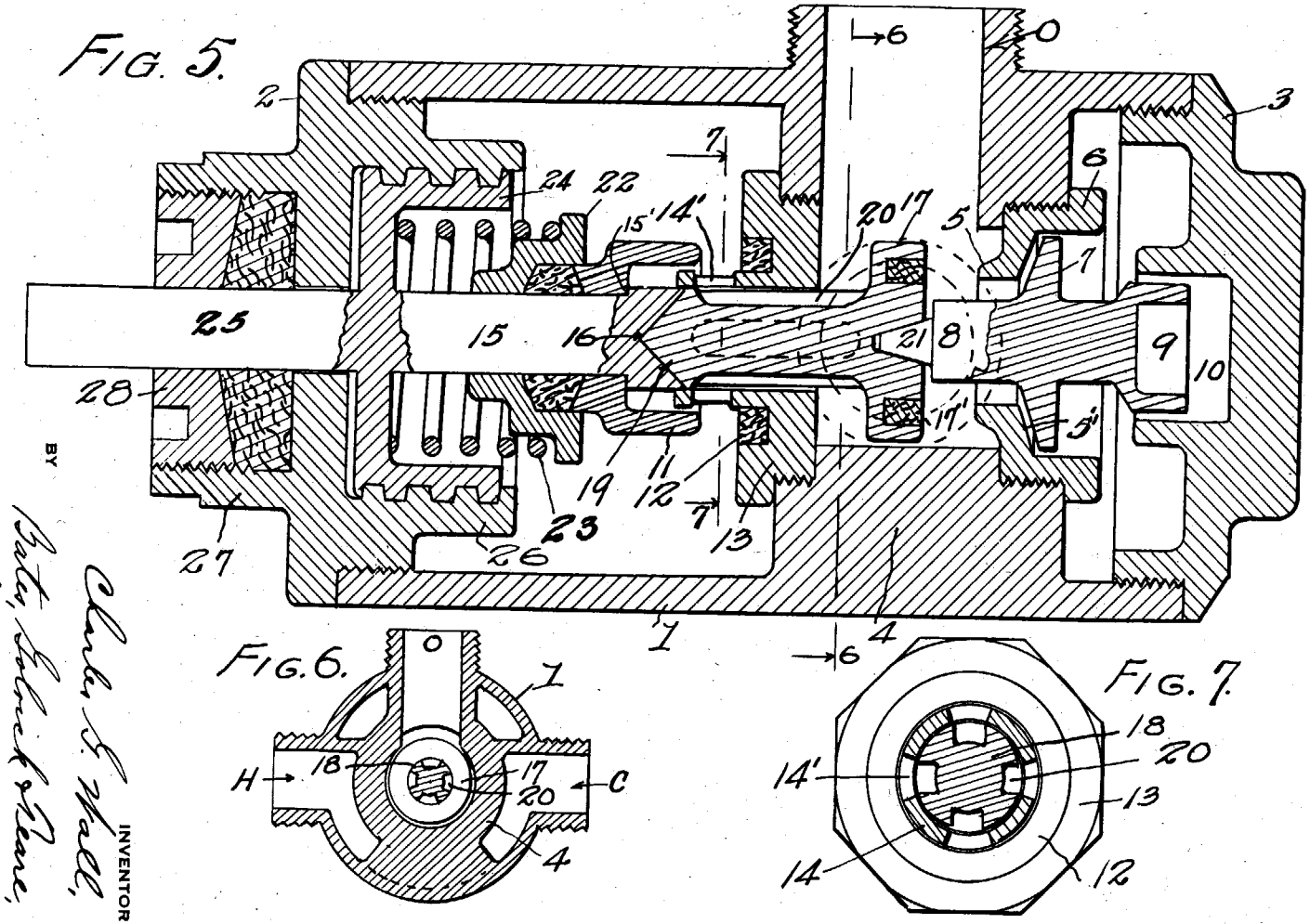
INVENTOR
Charles G. Wall,
BY
Bates, Golrick & Teare,
ATTORNEYS Reissued Aug. 30, 1938

Re. 20,836

UNITED STATES PATENT OFFICE 20,836

APPARATUS FOR MIXING FLUIDS

Charles G. Wall, Philadelphia, Pa.

Original No. 2,082,529, dated June 1, 1937, Serial No. 91,415, July 18, 1936. Renewed April 19, 1937. Application for reissue February 1, 1938, Serial No. 188,069

17 Claims. (Cl. 277—18)

My present invention relates to apparatus for mixing fluids of different temperatures, and to an improved valve device for the mixing of hot and cold water, or other fluids and the device of my invention may be utilized in connection with baths, faucets, lavatories, and other fixtures, it being especially designed and herein described and illustrated for use in connection with a shower-bath fixture or appliance.

In carrying out my invention, I employ two axially aligned rotary, and longitudinally movable valves for mixing the hot and cold fluids within a suitable casing, which valves are under control of a single operating handle or hand lever, and one of the valves, in addition to its function of controlling the entrance of a cold fluid, operates in the nature of a floating device, responsive to the pressure of the hot fluid to automatically shut off the hot fluid in an emergency, and assists in supplying the hot fluid for mixture with the cold fluid when both the hot fluid and the cold fluid valves are open for that purpose.

The invention comprises a method of utilizing the pressure of the hot fluid to cause the interruption of the flow of the same upon a failure in the pressure or flow of the cold fluid, and in certain novel arrangements of parts, as will hereinafter be more fully set forth and claimed.

In the accompanying drawings I have illustrated one complete example of a physical embodiment of my invention, wherein the parts are combined and arranged according to one mode I have thus far devised for the practical application of the principles of my invention. It will be understood, however, that changes and alterations are contemplated and may be made in the exemplifying drawings, within the scope of my appended claims, without departing from the principles of the invention.

Fig. 5 is a sectional view similar to Fig. 3, but enlarged to illustrate in section the details of construction of some of the interior parts of the device.

Fig. 6 is a transverse sectional view at line 6—6 of Fig. 5, (but on the scale of Figs. 2 and 3), showing the hot and cold water inlets, and the hot water outlet.

Fig. 7 is a transverse sectional detail view, at line 7—7 of Fig. 5, showing the hot water ports in section and a face view of the hot water valve-seat, together with the slotted piston of the floating control device.

My invention contemplates utilizing the pressure of the high temperatured fluid to shut off, automatically, the flow thereof to a mixing chamber, when there is a failure of or a substantial drop in the pressure of the low temperatured fluid flowing to said mixing chamber.

Figure 1:
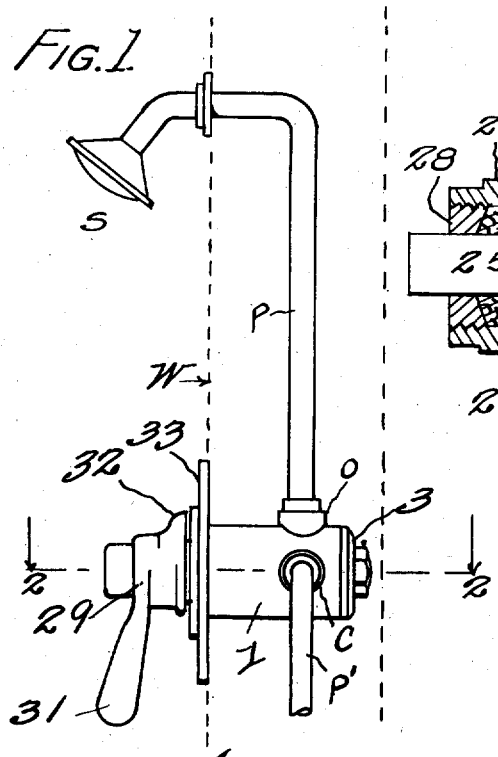
Fig. 1 is a view in elevation showing one form of apparatus adapted to fulfill the functions of my invention, when used in connection with a shower-bath appliance, the parts being indicated as concealed within a wall or panel.

In the assembly view of Fig. 1, a typical shower-head is indicated at S, as projecting from a panel or wall W indicated in dotted lines, and a supply pipe P, concealed within the wall, is connected at its lower end to the outlet O of the cylindrical casing 1 of the mixing valve device, which is also concealed and suitably mounted in the wall W. In such a use of the invention the fluids to be mixed usually are hot and cold water. Hence, a cold water pipe P′ is shown as connected with the cold water inlet C, and a similar pipe (not shown) is connected to hot water inlet H, the openings O, H and C, as indicated in Fig. 6, being in the same vertical plane passing through the cylindrical casing.

The opposite open ends of the casing are fashioned with interior threads for the reception of the front cover or cap 2 and the inner or rear cover or cap 3, respectively, which close the casing, and an intermediate cylindrical longitudinally extending wall 4, concentrically arranged, is fashioned within the cylinder or casing 1 at the plane of the two inlets, and the outlet of the casing. In the drawings, the cold water stream enters at C and passes toward the right end of the casing, then enters the cylinder 4 at its right end and flows upwardly through outlet O. The hot water enters at H and passes toward the left end of the cylinder 4, and then, after entering the left end of the mixing cylinder 4, passes upwardly, and is mixed with the cold water as it emerges through outlet O, so that the temperature of the water flowing through the supply pipe P and to the shower head S may be controlled as desired.

The cold water unit includes a valve seat member 5, disposed within the mixing chamber, open at the center and projecting inwardly at the rear or right end of the mixing cylinder, and this reduced annular seat is integral with a cup-shaped nut 6, threaded into the end of the mixing cylinder, and fashioned at its right or rear side with a tapered annular face 5′ forming the bottom of the depressed or recessed, open-center nut. Within the cup-shaped nut is mounted a circular disk 7, which forms a cold-water pressure head, and the disk which is integral with and disposed transversely of a solid cylindrical plunger 8, is adapted to reciprocate, longitudinally, in the cupped nut, and control the flow of cold water through the open valve seat member 5, from the right end of the casing 1 to the mixing chamber.

The plunger 8, when actuated toward the mixing chamber by the cold-water pressure acts upon a floating hot and cold water valve member, as will be described hereinafter.

To guide the plunger 8 in its reciprocating movement, and also to add surface area for use with the pressure head or disk 7, the rear end of the plunger is fashioned with a slightly enlarged cupped-head 9 that is located in a pressure chamber 10 of the casing head or cover 3. The cupped head 9 fits loosely in the wall of the chamber so that cold water, under pressure, may flow around, or by-pass around the cupped-head into the chamber, thus supplying an auxiliary pressure in addition to the cold water pressure against the disk 7, for urging the plunger toward the mixing chamber.

A manually operated hot water valve 11 is located between the front cover or casing head 2 and the mixing cylinder 4 and is fashioned as a hollow or tubular, circular head that is adapted to close against a packing ring 12 forming a valve-seat, which is inserted in a face-groove of a threaded and flanged holder 13, which is screwed into a complementary hole or open end of the mixing cylinder 4. The cup-shaped nut 6 and the holder 13 thus are disposed at the opposite ends of the mixing chamber, the nut 6 having the cold water valve-seat 5 within the mixing chamber, and the holder 13 providing the hot water valve-seat 12 exterior of the mixing chamber and in the hot water compartment of the cylindrical casing 1.

Figure 3:
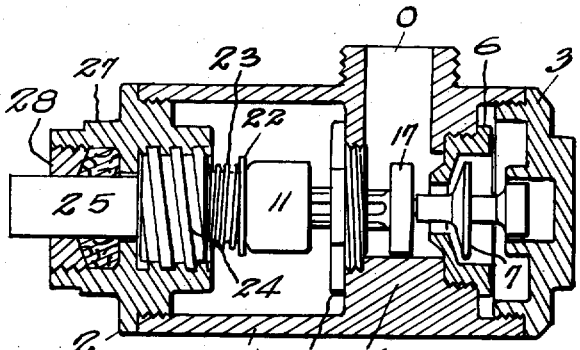
Fig. 3 is a vertical longitudinal view of the device, with the hot and cold water valves in open position for mixing the hot and cold water.
Figure 4:
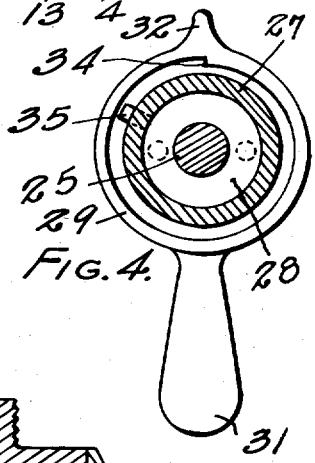
Fig. 4 is a transverse sectional view at line 4—4 of Fig. 1, showing the means for limiting the turning movement of the operating handle or hand-lever of the valves.
Figure 2:
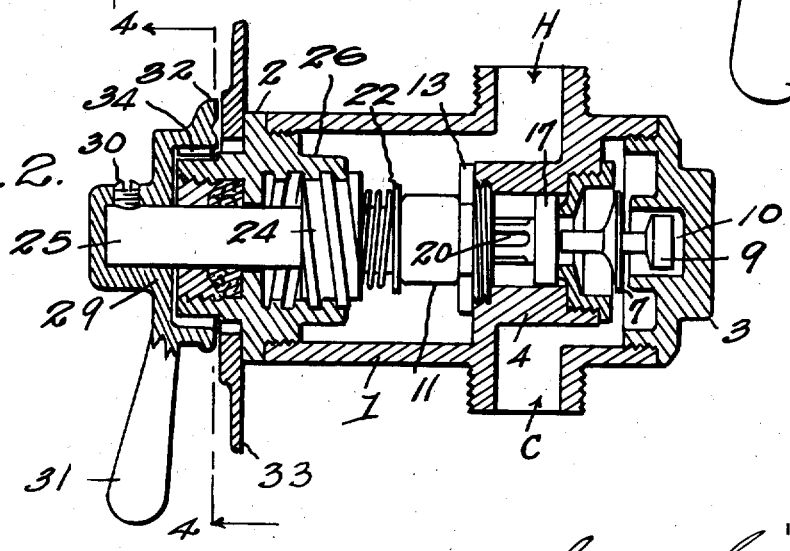
Fig. 2 is a longitudinal, horizontal, sectional view, enlarged, as at line 2—2 of Fig. 1, with the hot and cold water valves in closed position.

As best seen in Figs. 5 and 7, the seat holder 13 is fashioned with a central bushing 14 forming an extension about the central bore of the holder, and of less diameter than the inner periphery of the valve seat 12, and this projecting bushing, which is provided with radial ports as at 14′, terminates at its free end within the tubular valve-head 11. Thus, the tubular valve head is adapted to reciprocate, longitudinally, of the ported bushing, from the closed position of Fig. 2, where the valve head impinges with the seat 12, to the open position of Figs. 3 and 5, where the hot water valve is open.

In Fig. 5 it will be seen that the tubular valve head 11 is mounted on an auxiliary stem 15, comprising part of the manually operated stem 25, extending longitudinally at the center of the valve casing 1. This stem 15 is fashioned with a slightly enlarged socket head 16 adapted to reciprocate in the bushing 14 of the holder 13.

Positioned to reciprocally float in a hot water inlet formed centrally in the holder 13, and also to be moved positively in one direction by the inner end of the manually operated stem 15, is a hot and cold water valve member or floating piston 18, which is adapted to be actuated in one direction by cold water pressure and in the opposite direction by hot water pressure. This floating piston is formed with a piston head 17 disposed within the mixing chamber and is provided with a packing ring 17′, which is adapted to seat upon the cold water valve seat member 5. The piston 18 has a bearing or centering head 19 complementary to and adapted to seat in a socket 16 formed in the inner end of the auxiliary stem 15. This piston extends through the bore of the holder 13 and through its ported bushing 14, with the piston head or cold water valve end disposed in the mixing cylinder. The piston is provided with exterior longitudinally extending grooves 20 through which the hot water may flow, when valve 11 is open, from the hot water side of the casing 1 into the mixing cylinder or chamber 4. The floating piston is axially aligned with and located between the auxiliary stem 15 and the cold water plunger 8, and the latter is fashioned with a guide pin 21 for engagement in a socket formed at the center of the piston head or valve 17.

In the open position of the valves, as shown in Fig. 5, cold water pressure against the cupped-head 9 and the pressure disk 7, forces the plunger against the floating piston, and cold water is flowing around the disk or pressure head 7, through the open valve seat member 5 into the mixing cylinder. From the hot water side of the mixing cylinder, hot water is flowing through ports 14′ and grooves 20, into the mixing cylinder or chamber, and the mingling streams flow upwardly through the outlet O to the supply pipe P. Thus, the cold water pressure serves to maintain the piston in contact with the end of the auxiliary stem 15.

The manually operated hot water valve 11 is held against a shoulder 15′ provided on the auxiliary stem 15 through the instrumentality of a flanged spring-collar 22 mounted on the stem and provided with a packed joint between the tubular valve head and the collar. A valve spring 23 is interposed between the spring collar 22 and the transverse wall of a worm cup 24 in threaded engagement with a cap flange 26. The interior diameter of the cup 24 is ample to receive the spring and the collar, and the collar is spaced from the transverse wall of the cup to hold the spring under compression. This arrangement permits further inward movement of the stem 15 after the hot water valve 11 has been set to a closed position by manual operation of a main stem 25.

The worm cup, as indicated, is fashioned with quick-acting screw threads, and it may be fashioned integral with, or rigid with the main stem 25 of the valve device, it being understood that the main stem 25, the worm cup 24 and the auxiliary stem 15 are secured together in suitable manner so that they revolve or rotate in unison when the main stem 25 is turned.

The rotary unit including the main stem, the worm cup or screw head and the auxiliary stem, when turned in one direction, projects the two valves 11 and 17 to closed position, and when turned in the opposite direction, retracts the hot water valve from closed position. The head or cover 2 is provided with an exterior flange 27 and a packing nut 28 and a gasket or gland, surrounding the rotary valve stem 25, to prevent leakage of water through the open center of the cover or head 2.

The valve stem is turned manually through the instrumentality of a hollow, cylindrical head 29, rigidly secured on the projecting outer end of the stem 25, as by a set screw 30, and the head is fashioned with a usual operating handle or hand lever 31 which is readily accessible to the bather for controlling the flow of water. A pointer 32 is provided on the operating head for usual coaction with hot and cold water marks on the dial plate or wall plate 33 which is mounted on the head or cover 2 of the valve casing, and any suitable means may be employed for limiting the turning movement of the hand lever, as, for instance, an interior lug or shoulder 34 on the operating head, and a stop pin 35 located in suitable position and fixed to the flange 27 of the head 2 of the valve casing.

As the hand lever is turned to close the valves 11 and 17, it will be noted that the hot water valve, traveling a shorter distance than the cold water valve, is seated in advance of the seating of the cold water valve 17 against its seat 5. It will also be noted that from closed position a turning of the handle to open the valves first permits a full stream of cold water to flow to the mixing chamber before hot water is permitted to enter the mixing cylinder or chamber.

Inasmuch as the pressure disk 7 and the cup-disk 9 provide a cold water area subject to pressure, greater than the area of pressure against the piston head 17, it will be apparent that the cold water valve 17 is backed from its seat 5 under cold water pressure, when the handle 31 is turned to open the valves, and the cold water valve is thus opened by cold water pressure.

Should the cold water pressure, for any reason fail to open the cold water valve, an excessively hot, or scalding discharge from outlet O is prevented, by the automatic operation of the floating piston, which will remain in seated relation to the cold water valve seat 5. In the event of failure of the cold water pressure, while the shower is being used, the hot water pressure through ports 14′ and grooves 20 will impinge against the front face of the piston head 17 and move the floating piston to the right in Fig. 5. This movement carries the grooves 20 of the piston 18 away from their open communication with ports 14′, thereby cutting off flow of hot water through the grooves and excluding the hot water from the mixing cylinder or chamber 4. When the cold water pressure is again established, the piston head 17 is moved thereby, to open the cold water valve seat 5 for flow of cold water, and the grooves 20 again communicate with the hot water ports 14′, thereby admitting both cold water and hot water to the cylinder 4. Thus, the piston 18 comprises a second hot water valve which is operable independently of the auxiliary stem 15 by hot water pressure upon failure of the cold water pressure.

The cold water valve seat 5 is manually closed by the valve 17, due to the direct thrust of the rotary stem 15 against the end of the floating piston, while the hot water valve 11 is closed against its seat 12 under tension of the spring 23, which is compressed by the longitudinal movement of the worm cup 24, and continued longitudinal movement of the stem 15 is permitted to close the cold water valve after the hot water valve is closed.

A full stream of cold water may be had by turning the hand lever, up to the point at which the shoulder 15′ of the stem 15 is shifted outwardly to rest against the tubular or hollow hot water valve 11, after which continued movement of the stem results in withdrawal of the hot water valve 11 from its seat 12, thereby admitting hot water to the mixing chamber for mingling with the cold water stream.

The foregoing description of one use of my invention, namely, for the mixing of hot and cold water, it should be understood, is for disclosure purposes only, for the method of utilizing the hot water pressure to interrupt the hot water flow, should there be a failure of the cold water pressure or cold water flow, can be and is utilized for the mixing of other fluids of different temperatures. As an instance of another use of my invention, installations incorporating the claimed features thereof have been made for the purpose of heating water by the use of steam, in industrial plants where steam pressure is available, whereby a high degree of heat transfer efficiency is obtained in a compact device, without noise or hammering usually incident to the heating of cold water by the use of steam. It is to be understood, also, that the invention may be embodied in devices structurally different than the embodiment illustrated in the drawings, and particularly desire to direct attention to the advantages to be found in a device herein disclosed, wherein there are no springs relied upon to effect the automatic shutting off of the high temperatured fluid without resorting to the use of springs or thermal responsive apparatus.

I claim:

1. In a water-mixing valve-device the combination with a casing having an interior mixing chamber and a cold water valve seat opening into the chamber at one end, and an open-center-holder at the other end of the chamber having a valve seat exterior of the chamber, of a floating piston mounted in the holder having a head forming a valve adapted to close the cold water seat, means operative under cold water pressure to unseat the cold water valve, a longitudinally movable stem and a valve thereon to close the exterior valve seat, and said piston having means for communication between the mixing chamber and the hot water side of the casing.

2. In a water-mixing valve-device, the combination with a casing having an interior mixing chamber, a cold water valve seat in one end of the chamber, and an open center holder closing the other end of the chamber, said holder having a valve-seat and a hot water valve for said seat, and a ported bushing on the holder, of a ported piston movable in the holder, a piston head within the chamber adapted to close the cold water valve seat, and means operative under cold water pressure to unseat said piston head.

3. In a valve device having an interior mixing chamber, a cold water valve seat in one end of the chamber, an open-center holder closing the other end of the chamber and provided with a valve seat, and a hot water valve for the latter valve-seat, of a ported piston movable in said holder for coaction with the hot water valve, a piston head on the piston adapted to close the cold water valve seat, a longitudinally movable stem at one end of the piston, and a cold-water pressure-operated plunger mounted in the cold water valve seat adapted to unseat the piston head.

4. In a valve device having an interior mixing chamber, the combination with a longitudinally movable stem having a hot water valve exterior of one end of the chamber, a cold-water valve seat opening into the chamber and mounted in the other end of the chamber, a holder having an open center and mounted in the hot water side of the chamber and a seat in said holder for the hot water valve, of a floating piston mounted in the holder with one end abutting the stem, a ported bushing on the holder adapted to be overlapped by the hot water valve and adapted to coact with ports in the piston, a piston-head in the chamber adapted to close the cold water valve, and a cold-water pressure operated plunger aligned with the piston and adapted to unseat the latter from the cold water valve.

5. In a water mixing valve device, the combination with an open center holder having a ported bushing at one side, a grooved floating piston mounted in said holder and having a piston head at the other side of the holder, of a reciprocable stem having an end adapted to engage the piston and aligned with said piston, and a spring-pressed annular valve-member mounted on the stem, said valve member being adapted to engage the stem, and also adapted to enclose the ported bushing and engage the valve seat.

6. In a water-mixing valve-device the combination with a casing having a threaded annular flange, of a rotary stem having a complementary threaded hollow, barrel mounted in said flange, an auxiliary stem aligned with and rigid with the first stem, an annular valve-head mounted on the auxiliary stem and a spring interposed between the valve head and the hollow threaded barrel, a stationary open center holder and a valve seat therein, and said holder having a central ported bushing adapted to be enclosed by the valve head when the latter engages its seat.

7. In a mixing valve device, the combination with a casing having an interior mixing chamber and a partition wall having an opening leading into the chamber and a cold water valve seat associated with the opening, and a second partition wall having an opening leading into the chamber, said second wall having a valve seat disposed exteriorly of the chamber, of a piston mounted to operate in said last-named wall opening, said piston having a head forming a valve adapted to close on the cold water seat, means operative under cold water pressure to unseat the cold water valve, a manually operable stem and a valve thereon to close on said exteriorly disposed valve seat, and said piston having means for establishing communication between the mixing chamber and the hot water side of the casing when the cold water valve is open.

8. In a mixing valve device, the combination with a casing having a mixing chamber and a cold water valve seat disposed in the chamber, and a partition wall partly forming the chamber and having a fluid opening extending into the chamber, and said fluid opening having an associated valve seat, of a valve for closing the last-named seat, a piston mounted to move in said opening and having a head disposed within the chamber and adapted to close upon the cold water valve seat, and means operative under cold water pressure to unseat said piston head when said fluid valve is in open position.

9. In a mixing valve device, the combination with a casing having a mixing chamber of a cold water valve seat within the chamber, said casing having a partition wall provided with an opening leading into the chamber and said wall having a valve seat disposed exteriorly of the chamber, a piston mounted to operate in said wall opening and having a head forming a valve adapted to close the cold water seat, means operative under cold water pressure to unseat the cold water valve by shifting said piston, a manually operable stem and a valve thereon to close the exteriorly disposed valve seat, and said piston being formed to establish communication between the mixing chamber and one side of the casing when the cold water valve is open.

10. In a mixing valve device, the combination with a casing having a mixing chamber, a cold water valve seat formed in the chamber, a partition wall partly forming the chamber and having an opening extending into the chamber remote from the cold water valve seat, said opening having an associated valve seat, a valve means associated with the last-named seat, a piston mounted to move in said opening and having valve means thereon disposed within the chamber and adapted to close the cold water valve seat, and means operative under cold water pressure to unseat said piston valve means.

11. In a valve device, having a mixing chamber, a cold water valve seat within the chamber, a partition wall partly forming the chamber having an opening extending into the chamber and having a valve seat disposed exteriorly of the chamber and associated with said opening, the combination of a valve for the last-named valve seat, a piston movable in said opening for coaction with said valve and to be positively moved when said valve is moved to closed position, said piston being adapted to close upon the cold water valve seat, a manually operable stem adapted to act upon the piston and the piston being formed to comprise a cold water shut-off valve adapted to be pressure-operated to an open position by the cold water pressure.

12. In a device of the character described, the combination in a valve body of two partitions within the valve body partly forming a mixing chamber, said partitions having aligned valve openings, a valve seat associated with one of the openings and disposed within the mixing chamber, a valve seat associated with the other of said openings and disposed exteriorly of the chamber, a cold water pressure-operated piston extending through one of said openings having valve means for closing both of said openings and a manually operable stem in alignment with the piston and adapted to operate the piston to close one of said valve openings.

13. In a device of the character described, the combination in a valve body of two partitions within the valve body partly forming a mixing chamber, said partitions having valve openings, a valve seat associated with one of the openings and disposed within the mixing chamber, a valve seat associated with the other of said openings and disposed exteriorly of the chamber, a fluid pressure-operated piston slidably supported by one of said partitions in one of said openings having valve means for closing both of said openings and a manually operable stem in alignment with the piston and having an end formed to center the piston and an auxiliary cold water pressure operated means extending through the other of said portions having means for centering one end of the piston.

14. In a device of the character described, the combination in a valve body having a fluid mixing chamber formed therein, high and low temperatured fluid passageways extending into the mixing chamber, a cold water pressure-operated piston extending through one of said passageways having valve means for closing both of said passageways and a manually operable stem in alignment with the piston and adapted to operate the piston to close one of said passageways.

15. In a device of the character described, the combination in a valve body having internal partitions forming a mixing chamber, said partitions having valve openings, a fluid pressure-operated piston slidably supported by one of said partitions in one of said openings and having valve means for closing both of said openings and a manually operable stem in alignment with the piston to act thereon and having valve means thereon for closing one of said openings independently of any closing action of said piston relative to said opening.

16. In a mixing valve device, the combination with a casing having a mixing chamber formed therein and having two fluid inlets leading into the chamber, a reciprocating member adapted to close said inlets and a manually operated valve means for closing one of said inlets independently of the action of said reciprocating member.

17. In a mixing valve device, the combination with a casing having a mixing chamber formed therein and having a low temperatured fluid inlet and a high temperatured fluid inlet leading into the chamber, a manually operated valve means for closing the high temperatured fluid inlet and a reciprocating member operated in one direction by the manually operated valve means to close the low temperatured inlet and also adapted to close the low temperatured inlet automatically upon failure of the pressure of the low temperatured fluid flowing into the mixing chamber.

CHARLES G. WALL.